United States Patent Office 3,336,318
Patented Aug. 15, 1967

3,336,318
1-ACETO-SUBSTITUTED QUINOLIZINES
Richard E. Brown, Hanover, and Robert I. Meltzer, Rockaway, N.J., assignors to Warner-Lambert Pharmaceutical Company, Morris Plains, N.J., a corporation of Delaware
No Drawing. Filed June 16, 1966, Ser. No. 557,911
18 Claims. (Cl. 260—289)

This invention relates to novel substituted quinolizines and more particularly this invention relates to 1-aceto substituted quinolizines of the general structures:

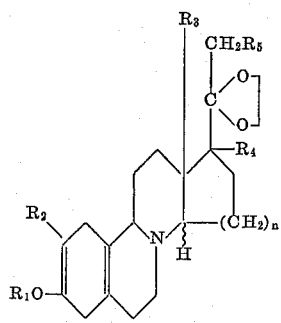

or

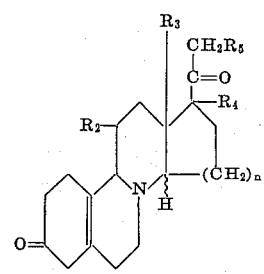

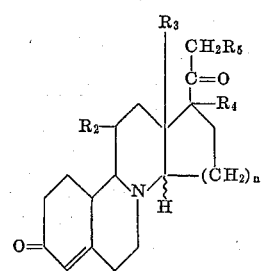

wherein $R_1$ is lower alkyl of 1 to 6 carbon atoms such as methyl, ethyl, propyl, isopropyl and the like; $R_2$ is hydrogen, hydroxy, keto or lower acyloxy of 1 to 6 carbon atoms such as formyloxy, acetoxy, propionyloxy and the like; $R_3$ is hydrogen or lower alkyl of 1 to 6 carbon atoms; $R_4$ and $R_5$ are each hydrogen, hydroxy or lower acyloxy of 1 to 6 carbon atoms and $n$ is an integer of from 1 to 2. The symbols $R_1$, $R_2$, $R_3$, $R_4$, $R_5$ and $n$ as used hereinafter have the same meaning as defined.

This invention also includes within its scope a novel process for the production of the above compounds.

The compounds of this invention exhibit significant and interesting steroidal-like properties. They are useful in the treatment of circulatory collapse, as anti-inflammatory agents and in endocrine replacement therapy. In use these compounds are combined with an inert pharmaceutical carrier to form dosage forms such as tablets, capsules, suspension, suppositories, solutions for injection and the like with the active ingredient being present from about 0.5 to 100 mg. per dosage unit. They may also be combined with a carrier such as petrolatum and used as a topical anti-inflammatory agent in a ratio of about 1:100.

In addition, the compounds of this invention are useful as starting materials for the production of other substituted quinolizines.

The compounds of this invention when $n$ is one has the following numbering system:

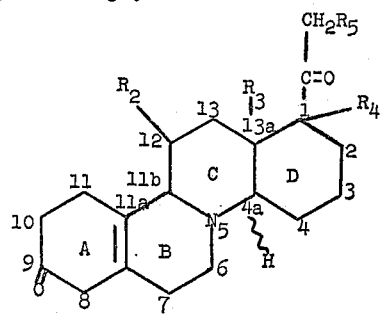

According to our novel process, these compounds may be prepared using as starting materials, compounds of the structure IV:

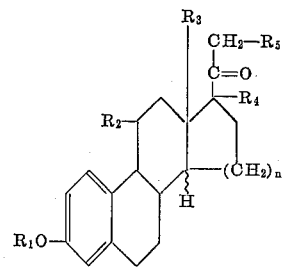

IV

The preparation and the description of the above starting materials are described in our copending application Ser. No. 473,811, filed July 21, 1965. For a more detailed description as to the sources of our starting materials, see Ser. No. 323,896, now U.S. Patent 3,261,839.

The starting material IV is converted to the compounds of this invention by treatment with a metal-amine reducing system in the presence of a proton donor such as an alcohol. Among metals useful for this reduction are, for example, sodium, lithium and potassium. Useful common solvents are, for example, liquid ammonia and low molecular weight amines such as methylamine, ethylamine and the like. Alcohols useful as proton donors in this reaction are, for example, methanol, ethanol, propanol, butanol, iso-butanol, t-butanol and the like. Employing such a reducing system as described, the starting material IV is converted to the corresponding enol ether corresponding to structure I. This reaction is usually accompanied by concurrent reduction of the acetyl group at position 1, unless precautionary measures are taken to avoid this side reaction. Thus, we have found this may be accomplished by converting the acetyl group to the corresponding cyclic-ketal, preferably its ethylene ketal corresponding to V below:

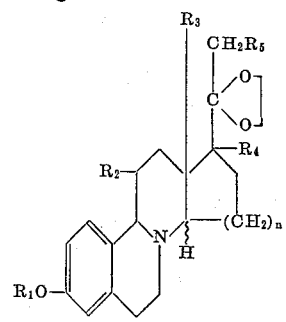

V

The process may be effected employing the usual Salmi conditions described in Ber., vol. 71, page 1803 (1938).

Alternatively, metal-amine reduction of IV without prior protection of the ketone may be carried out to yield an alcohol of the Formula VI:

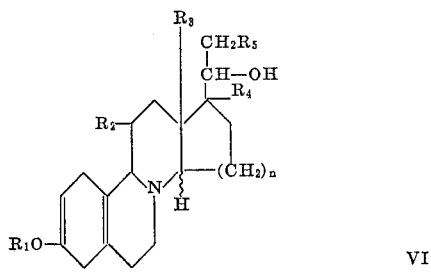

which may then be re-oxidized to I under appropriate conditions such as under the conditions described by Oppenauer oxidation, H. Meerwein and R. Schmidt, Ann. 444, 221 (1925).

It is apparent to those skilled in the art that the metal-amine-alcohol conditions described in this invention will also bring about concurrent conversion of any ester groups at $R_2$ and $R_4$ to the corresponding alcohols and these alcoholic groups may then be re-esterified by standard procedures known to the art. Likewise, it is apparent that a keto group at $R_2$ will also be reduced to the corresponding alcohol unless protected and that re-oxidation to the alcohol may also be effected after the metal-amine alcohol procedure.

The compounds of this invention corresponding to structure I may then be hydrolyzed under mild acidic conditions to yield the corresponding unconjugated ketone II or they may be hydrolyzed under more vigorous acidic conditions, whereby rearrangement of the double bond takes place to yield the conjugated ketone III. Alternatively, compound II may be converted to III in the presence of a base such as sodium or potassium hydroxide.

The following examples are included in order further to illustrate the invention. All temperatures are given in degrees centigrade. Room temperature is about 20° C. to 30° C.

EXAMPLE 1

*1,2,3,3a,5,6,7,10,10a,11,12,12a - dodecahydro - 1 - ethylenedioxyacetyl - 8 - methoxy - 11 - hydroxy - 12 - methyl-benz[a]cyclopenta[f]quinolizine*

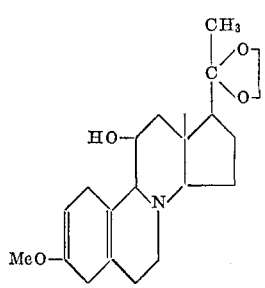

A solution of 5 gr. of 1,2,3,3a,5,6,10b,11,12,12a-decahydro - 1 - acetyl - 8 - methoxy - 11 - hydroxy - benz[a]cyclopenta[f]quinolizine hydrochloride and 5 gr. of p-toluenesulfonic acid in 50 ml. of ethylene glycol is diluted with 300 ml. of benzene and refluxed for 4 hr. under a water separator. The solution is cooled, washed with 5% sodium hydroxide solution, dried over magnesium sulfate and the benzene removed. The ketal thus obtained is dissolved in a mixture of 200 ml. of tetrahydrofuran and 50 ml. of t-butanol and added to 600 ml. of liquid ammonia. Lithium (4.5 gr.) is added in small pieces and the mixture is stirred for 2 hr. at reflux. The blue color is discharged by the addition of ethanol. The ammonia is allowed to evaporate and the tetrahydrofuran and t-butanol are removed by distillation. The residue is partitioned between water and methylene chloride. The organic phase is dried and concentrated to give 1,2,3,3a,5,6,7,10,10b,11,12,12a - dodecahydro - 1 - ethylendioxyacetyl - 8 - methoxy - 11 - hydroxy - 12a - methyl -benz[a]cyclopenta[f]quinolizine as a white solid, M.P. 197–200° C.

EXAMPLE 2

*1,2,3,3a,5,6,7,8,9,10,10b,11,12,12a - tetradecahydro - 1-acetyl - 11 - hydroxy-12a-methyl-benz[a]cyclopenta[f]quinolizine-8-one*

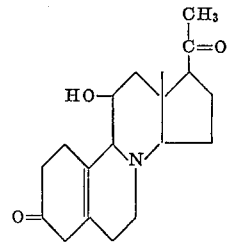

A solution of 1.0 gr. of 1,2,3,3a,5,6,7,10,10b,11,12,12a-dodecahydro - 1 - ethylendioxyacetyl - 8 - methoxy - 11-hydroxy - 12a-methyl-benz[a]cyclopenta[f]quinolizine in 20 ml. of methanol is treated with 1 gr. of oxalic acid dihydrate and the solution is left at room temperature for 4 hr. The solution is evaporated to a paste and partitioned between ethyl acetate and 5% sodium hydroxide solution. The organic phase is dried and concentrated to an oil. The oil is recrystallized from ethyl acetate to give 1,2,3,3a,5, 6,7,8,9,10,10b,11,12,12a - tetradecahydro - 1 - acetyl - 11-hydroxy - 12a - methyl - benz[a]cyclopenta[f]quinolizine-8-one as white crystals, M.P. 178–180° C.

EXAMPLE 3

*1,2,3,3a,5,6,8,9,10,10a,10b,11,12,12a - tetradecahydro - 1-acetyl - 11 - hydroxy-12a-methyl-benz[a]cyclopenta[f]quinolizine-8-one*

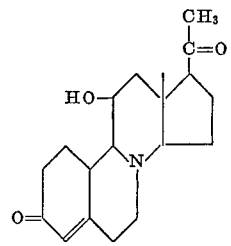

A solution of 5 gr. of 1,2,3,3a,5,6,7,10,10b,11,12,12a-dodecahydro - 1 - ethylenedioxyacetyl - 8 - methoxy - 11-hydroxy - 12a - methyl-benz[a]cyclopenta[f]quinolizine is dissolved in 20 ml. of concentrated hydrochloric acid and left at room temperature for 48 hr. The solution is concentrated to dryness, and the residue is triturated with ethanol. The solid is recrystallized from methanol-ether to give 1,2,3,3a,5,6,8,9,10,10a,10b,11,12,12a-tetradecahydro - 1-acetyl-11-hydroxy-12a-methyl-benzyl[a]cyclopenta[f]quinolizine-8-one-hydrochloride as white crystals M.P. 251–252° C. The free base is obtained by neutralization and melts at 151–152° C. after recrystallization from ethyl acetate.

EXAMPLE 4

*1,2,3,3a,5,6,7,10,10b,11,12,12a - dodecahydro - 1β - hydroxy - 1α-ethylenedioxyacetyl-8-methoxy-12a-methyl-benz[a]cyclopenta[f]quinolizine*

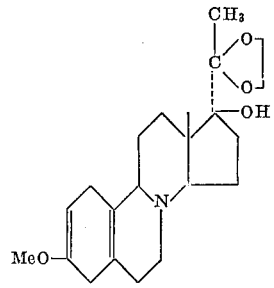

In the same way as described in Example 1, 5 gr. of 1,2,3,3a,5,6,10b,11,12,12a - decahydro - 1β-hydroxy-1α-acetyl - 8 - methoxy - 12a - methyl - benz[a]cyclopenta[f]quinolizine is converted to its ethylene ketal and subjected to Birch, (J. Chem. Soc., 1944, page 430) reduction to give 1,2,3,3a,5,6,7,10,10b,11,12,12a-dodecahydro-1β - hydroxy - 1α - ethylenedioxyacetyl - 8 - methoxy-12a-methyl - benz[a]cyclopenta[f]quinolizine as a white solid, M.P. 135–140° C.

EXAMPLE 5

*1,2,3,3a,5,6,8,9,10,10a,10b,11,12,12a - tetradecahydro-1β-hydroxy - 1α - acetyl - 12a - methyl - benz [a]cyclopenta[f]quinolizine-8-one*

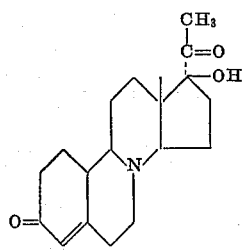

A solution of 4.6 gr. of 1,2,3,3a,5,6,7,10,10b,11,12,12a-dodecahydro - 1β - hydroxy - 1α - ethylenedioxyacetyl-8-methoxy-12a-methyl-benz[a]cyclopenta[f]quinolizine in a mixture of 60 ml. of methanol and 40 ml. of 3 N hydrochloric acid is refluxed for 20 minutes. The mixture is concentrated to a small volume and made basic with ammonium hydroxide. The precipitate is extracted with ether and the ether solution is concentrated to 3.4 gr. of yellow solid. The solid is recrystallized from isopropanol to give 1,2,3,3a,5,6,8,9,10,10a,10b,11,12,12a - tetradecahydro-1β-hydroxy - 1α - acetyl - 12a - methyl - benz[a]cyclopenta[f]quinolizine-8-one as crystals, M.P. 191–194° C.

EXAMPLE 6

*1,2,3,3a,5,6,7,10,10b,11,12,12a - dodecahydro - 1α - hydroxy-1β - ethylenedioxyacetyl-8 - methoxy-12a-methyl-benz[a]cyclopenta[f]quinolizine*

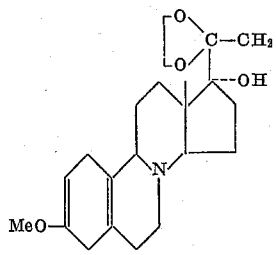

In the same way as described in Example 1, 3.3 gr. of 1,2,3,3a,5,6,10b,11,12,12a - decahydro-1α - hydroxy-1β-acetyl-8 - methoxy - 12a - methyl - benz[a]cyclopenta[f]quinolizine is converted to its ethylene ketal and is subjected to Birch reduction to give 3.0 gr. of 1,2,3,3a,5,6,7,10,10b,11,12,12a - dodecahydro-1α - hydroxy - 1β-ethylenedioxyacetyl - 8 - methoxy-12a - methyl-benz[a]cyclopenta[f]quinolizine as a viscous oil.

EXAMPLE 7

*1,2,3,3a,5,6,8,9,10,10a,10b,11,12,12a - tetradecahydro-1α-hydroxy-1β-acetyl - 12a - methyl-benz[a]cyclopenta[f]quinolizine-8-one*

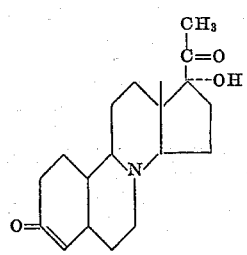

In the same way as described in Example 5, 3.0 gr. of 1,2,3,3a,5,6,7,10,10b,11,12,12a - dodecahydro - 1α-hydroxy-1β - ethylenedioxyacetyl - 8 - methoxy-12a-methyl-benz[a]cyclopenta[f]quinolizine is hydrolyzed to give 1,2,3,3a,5,6,8,9,10,10a,10b,11,12,12a - tetradecahydro-1α-hydroxy - 1β - acetyl-12a - methyl-benz[a]cyclopenta[f]quinolizine-8-one as yellow crystals, M.P. 191–193° C. after recrystallization from isopropanol (mixed M.P. with the product of Example 5, 172–174° C.).

EXAMPLE 8

*1,2,3,3a,5,6,7,10,10b,11,12,12a - dodecahydro-1 - hydroxy [ethylenedioxy]acetyl-8-methoxy - 12a - methyl-benz[a]cycopenta[f]quinolizine*

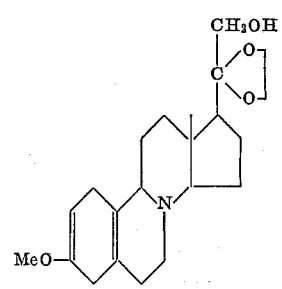

In the same way as described in Example 1, a solution of 7.5 gr. of 1,2,3,3a,5,6,10b,11,12,12a - decahydro-1-acetoxy - acetyl - 8-methoxy-12a-methylbenz[a]cyclopenta[f]quinolizine is converted to its ethylene ketal and subjected to Birch reduction to give 5.9 gr. of 1,2,3,3a,5,6,7,10,10b,11,12,12a - dodecahydro - 1 - hydroxy[ethylenedioxy]acetyl - 8 - methoxy-12a-methyl-benz[a]cyclopenta[f]quinolizine as a heavy yellow oil which solidifies to a low melting solid on standing.

EXAMPLE 9

*1,2,3,3a,5,6,8,9,10,10a,10b,11,12,12a - tetradecahydro - 1-acetoxyacetyl - 12a - methyl - benz[a] - cyclopenta[f]quinolizine-8-one*

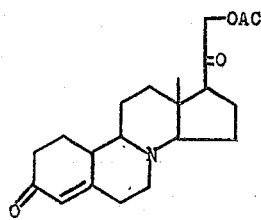

A solution of 5.9 gr. of 1, 2, 3, 3a,5,6,7,10,10b,11,12,12a-dodecahydro - 1 - hydroxy[ethylenedioxy]acetyl-8-methoxy - 12a-methyl-benz[a]cyclopenta[f]quinolizine is dissolved in 50 ml. of concentrated hydrochloric acid and heated to 100° for 10 min. The mixture is cooled and made basic with ammonium hydroxide. The yellow oil is extracted with methylene chloride and dissolved in a mixture of 200 ml. of acetic acid and 50 ml. of acetic anhydride. 5 gr. of p-toluenesulfonic acid are added and the mixture is set aside overnight at 25° C. The mixture is concentrated to an oil, ice and dilute ammonium hydroxide are added, and the oil is extracted with ether. The ether is removed and the residue is chromatographed on 500 gr. fluorisil. The column is washed with benzene, methylenechloride and anhydrous ether. The column is then eluted with a 10% solution of ethanol in ether to give 1.2 gr. of a solid. The solid is recrystallized from isopropanol to give 1,2,3,3a,5,6,8,9,10,10a,10b,11,12,12a-tetradecahydro - 1 - acetoxyacetyl-12a-methyl-benz[a]cyclopenta[f]quinolizine-8-one as white crystals, M.P. 122–125° C.

EXAMPLE 10

*1,2,3,3a,5,6,7,10,10b,11,12,12a - dodecahydro-1,11 - dihydroxy-1-hydroxy[ethylenedioxy]acetyl - 12a - methyl-8-methoxy-benz[a]cyclopenta[f]quinolizine*

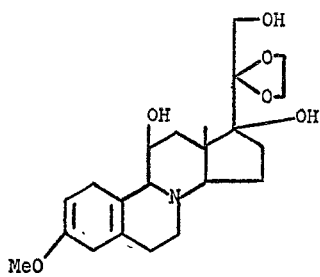

In the same way as described in Example 1, a solution of 1.5 gr. of 1,2,3,3a,5,6,10b,11,12,12a-decahydro-1, 11 - dihydroxy - 1 - acetoxyacetyl-8-methoxy-12a-methyl-benz[a]cyclopenta[f]quinolizine is converted to its ethylene ketal and subjected to Birch reduction to give 1,2,3, 3a,5,6,7,10,10b,11,12,12a - dodecahydro - 1,11-dihydroxy-1-hydroxy[ethylenedioxy]acetyl - 12a-methyl-8-methoxy-benz[a]cyclopenta[f]quinolizine as white crystals, M.P. 199–201° C. after recrystallization from ethanol.

EXAMPLE 11

*1,2,3,3a,5,6,8,9,10,10a,10b,11,12,12a - tetradecahydro - 1, 11-dihydroxy - 1 - hydroxyacetyl - 12a - methyl-benz[a] cyclopenta[f]-quinolizine-8-one*

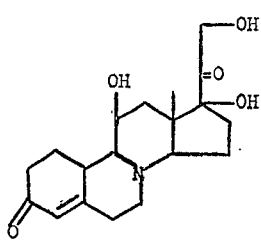

In the same way as described in Example 5, 1.0 gr. of 1,2,3,3a,5,6,7,10,10b,11,12,12a - dodecahydro - 1,11 - dihydroxy - 1 - hydroxy[ethylenedioxy]acetyl - 12a-methyl-8 - methoxy - benz[a] - cyclopenta[f]quinolizine is hydrolyzed to give 1,2,3,3a,5,6,8,9,10,10a,10b,11,12,12a-tetradecahydro - 1,11 - dihydroxy - 1 - hydroxyacetyl-12a-methylbenz[a]cyclopenta[f]quinolizine - 8 - one as white crystals, M.P. 141–143° C. after recrystallization from ethanol.

EXAMPLE 12

*1,2,3,3a,5,6,7,10,10b,11,12,12a - dodecahydro - 1-hydroxy-1 - hydroxy-[ethylenedioxy]acetyl - 8 - methoxy - 12a-methyl-benz[a]cyclopenta-[f]quinolizine*

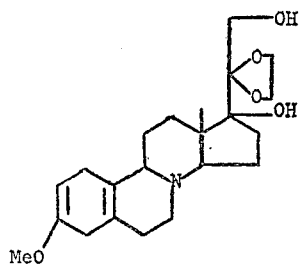

In the same way as described in Example 1, 7.0 gr. of 1,2,3,3a,5,6,10b,11,12,12a - decahydro - 1 - hydroxy - 1-acetoxyacetyl - 8 - methoxy - 12a - methyl-benz[a]cyclopenta[f]quinolizine is converted to its ethylene ketal and subjected to Birch reduction to give 1,2,3,3a,5,6,7,10,10b, 11,12,12a - dodecahydro - 1 - hydroxy - 1 - hydroxy [ethylenedioxy]acetyl - 8 - methoxy - 12a - methyl-benz [a]cyclopenta[f]quinolizine as white crystals, M.P. 201–204° C. after recrystallization from isopropanol.

EXAMPLE 13

*1,2,3,3a,5,6,7,8,9,10,10b,11,12,12a - tetradecahydro - 1-hydroxy-1-hydroxyacetyl - 12a - methyl-benz[a]cyclopenta [f]-quinolizine-8-one*

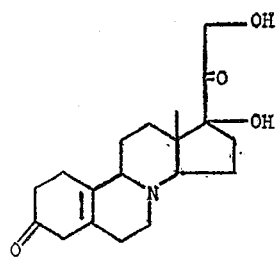

In the same way as described in Example 2, 2.0 gr. of 1,2,3,3a,5,6,7,10,10b,11,12,12a - dodecahydro - 1-hydroxy-1 - hydroxy[ethylenedioxy]acetyl - 8 - methoxy - 12a-methyl-benz[a]cyclopenta[f]quinolizine is hydrolyzed to give 1,2,3,3a,5,6,7,8,9,10,10b,11,12,12a-tetradecahydro-1-1 - hydroxy - 1 - hydroxyacetyl - 12a - methyl-benz[a] cyclopenta[f]quinolizine - 8-one as white crystals, M.P. 183–184° C. after recrystallization from ethylacetate.

It is understood that the foregoing detailed description is given merely by way of illustration and that many variations may be made therein without departing from the spirit of our invention.

Having described our invention, what we desire to secure by Letters Patent is:

1. Compounds of the formula:

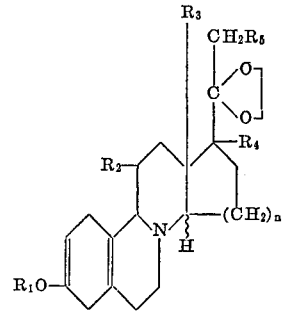

or

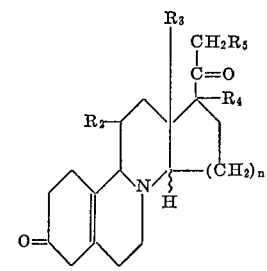

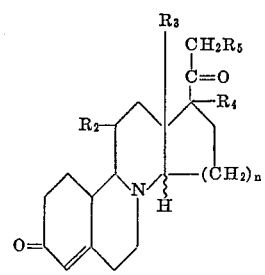

wherein $R_1$ is lower alkyl, $R_2$ is hydrogen, $R_3$ is hydrogen, methyl or ethyl, $R_4$ is hydroxy or acyloxy of a carboxylic acid and $R_5$ is hydrogen or acyloxy of a carboxylic acid and $n$ is 1 or 2.

2. Compounds of the formula:

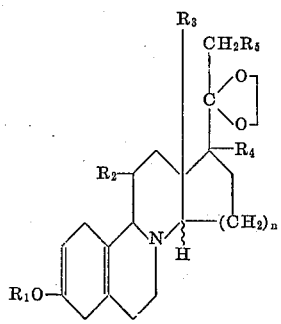

or

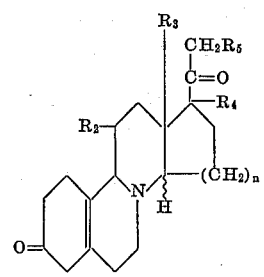

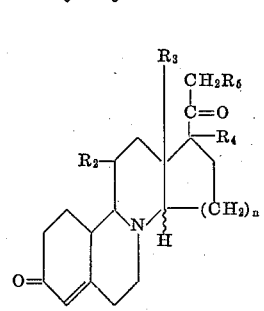

wherein $R_1$ is lower alkyl, $R_2$ is hydroxy, acyloxy of a carboxylic acid or keto, $R_3$ is hydrogen, methyl or ethyl, $R_4$ is hydrogen and $R_5$ is hydrogen, hydroxy or acyloxy of a carboxylic acid and $n$ is 1 or 2.

3. Compounds of the formula:

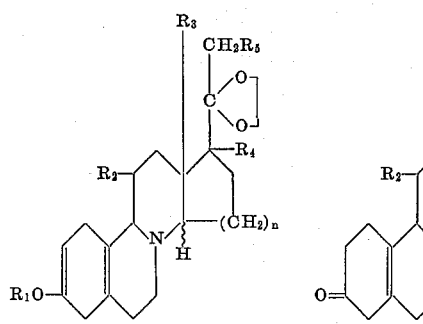

or

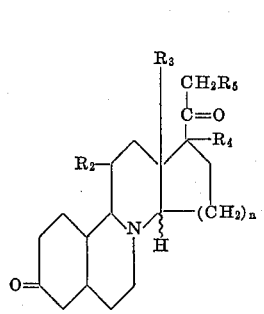

wherein $R_1$ is lower alkyl, $R_2$ and $R_4$ are each hydrogen, $R_3$ is hydrogen, methyl or ethyl and $R_5$ is hydroxy or acyloxy of a carboxylic acid and $n$ is 1 or 2.

4. Compounds of the formula:

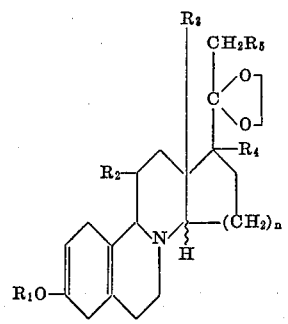

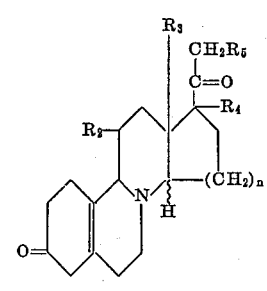

or

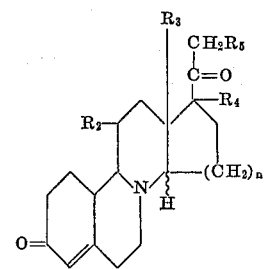

wherein $R_1$ is lower alkyl, $R_2$ is hydroxy, acyloxy of a carboxylic acid or keto, $R_3$ is hydrogen, methyl or ethyl, $R_4$ is hydroxy or acyloxy of a carboxylic acid and $R_5$ is hydrogen and $n$ is 1 or 2.

5. Compounds of the formula:

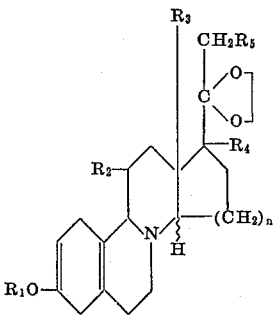

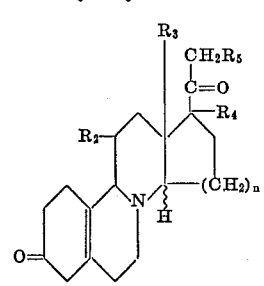

or

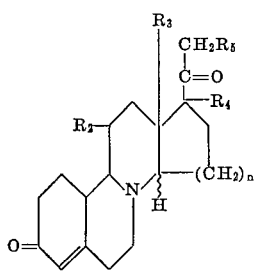

wherein $R_1$ is lower alkyl, $R_2$ is hydroxy, acyloxy of a carboxylic acid or keto, $R_3$ is hydrogen, methyl or ethyl, $R_4$ and $R_5$ are each hydroxy or acyloxy of a carboxylic acid and $n$ is 1 or 2.

6. 1,2,3,3a,5,6,7,10,10b,11,12,12a-dodecahydro-1-ethylenedioxyacetyl - 8-methoxy-11-hydroxy-12a-methyl-benzo[a]cyclopenta[f]quinolizine.

7. 1,2,3,3a,5,6,7,8,9,10,10b,11,12,12a-tetradecahydro-1-acetyl - 11 - hydroxy-12a-methyl-benzo[a]cyclopenta[f]quinolizine-8-one.

8. 1,2,3,3a,5,6,8,9,10,10a,10b,11,12,12a-tetradecahydro-1 - acetyl-11-hydroxy-12a-methyl-benzo[a]cyclopenta[f]-quinolizine-8-one.

9. 1,2,3,3a,5,6,7,10,10b,11,12,12a - dodecahydro-1β-hydroxy - 1α - ethylenedioxyacetyl - 8-methoxy-12a-methyl-benzo[a]cyclopenta[f]quinolizine.

10. 1,2,3,3a,5,6,8,9,10,10a,10b,11,12,12a - tetradecahydro - 1β - hydroxy - 1α-acetyl-12a-methyl-benzo[a]cyclopenta[f]quinolizine-8-one.

11. 1,2,3,3a,5,6,7,10,10b,11,12,12a - dodecahydro - 1α-hydroxy - 1β-ethylenedioxyacetyl-8-methoxy-12a-methyl-benzo[a]cyclopenta[f]quinolizine.

12. 1,2,3,3a,5,6,8,9,10,10a,10b,11,12,12a - tetradecahydro - 1α - hydroxy-1β-acetyl-12a-methyl-benzo[a]cyclopenta[f]quinolizine-8-one.

13. 1,2,3,3a,5,6,7,10,10b,11,12,12a - dodecahydro - 1-hydroxy[ethylenedioxy]acetyl - 8 - methoxy-12a-methyl-benzo[a]cyclopenta[f]quinolizine.

14. 1,2,3,3a,5,6,8,9,10,10a,10b,11,12,12a - tetradecahydro - 1-acetoxyacetyl-12a-methyl-benzo[a]cyclopenta[f]-quinolizine-8-one.

15. 1,2,3,3a,5,6,7,10,10b,11,12,12a - dodecahydro-1,11-dihydroxy - 1-hydroxy[ethylenedioxy]acetyl-12a-methyl-8-methoxy-benzo[a]cyclopenta[f]quinolizine.

16. 1,2,3,3a,5,6,8,9,10,10a,10b,11,12,12a - tetradecahydro-1,11 - dihydroxy - 1-hydroxyacetyl-12a-methyl-benzo[a]cyclopenta[f]quinolizine-8-one.

17. 1,2,3,3a,5,6,7,10,10b,11,12,12a - dodecahydro-1-hydroxy - 1 - hydroxy[ethylenedioxy]acetyl-8-methoxy-12a-methyl-benzo[a]cyclopenta[f]quinolizine.

18. 1,2,3,3a,5,6,7,8,9,10,10b,11,12,12a - tetradecahydro-1 - hydroxy - 1-hydroxyacetyl-12a-methyl-benzo[a]cyclopenta[f]quinolizine-8-one.

References Cited

Kanoaka Chem. Pharm. Bull., vol. 7, pp. 595–7 (1959).
Osbourne et al.; J. Pharm. and Expt'l Therap, vol. 147, pp. 224–31 (1964).

ALEX MAZEL, *Primary Examiner.*

D. DAUS, *Assistant Examiner.*